United States Patent
Cudak et al.

(10) Patent No.: US 10,831,349 B2
(45) Date of Patent: Nov. 10, 2020

(54) IMPLEMENTING AUTOMATED PERSONALIZED, CONTEXTUAL ALERT DISPLAYS

(71) Applicant: International Business Machines Corporation, Armonk, NY (US)

(72) Inventors: Gary D. Cudak, Wake Forest, NC (US); Christopher J. Hardee, Raleigh, NC (US); Sarbajit K. Rakshit, Kolkata (IN); Adam Roberts, Moncure, NC (US)

(73) Assignee: International Business Machines Corporation, Armonk, NY (US)

( * ) Notice: Subject to any disclaimer, the term of this patent is extended or adjusted under 35 U.S.C. 154(b) by 542 days.

(21) Appl. No.: 15/016,525

(22) Filed: Feb. 5, 2016

(65) Prior Publication Data
US 2017/0228134 A1     Aug. 10, 2017

(51) Int. Cl.
*G06F 3/0484* (2013.01)
*G06F 3/0481* (2013.01)
*G06Q 30/02* (2012.01)

(52) U.S. Cl.
CPC ...... *G06F 3/04842* (2013.01); *G06F 3/04817* (2013.01); *G06Q 30/0277* (2013.01)

(58) Field of Classification Search
CPC . G06Q 30/0277; G06Q 30/00; G06Q 30/0224
See application file for complete search history.

(56) References Cited

U.S. PATENT DOCUMENTS

| | | | | |
|---|---|---|---|---|
| 6,381,465 | B1* | 4/2002 | Chern | H04L 51/38 |
| | | | | 455/466 |
| 6,460,038 | B1* | 10/2002 | Khan | G06F 16/9562 |
| 6,678,663 | B1 | 1/2004 | Mayo | |
| 6,678,866 | B1* | 1/2004 | Sugimoto | G06Q 30/02 |
| | | | | 715/203 |
| 7,814,145 | B2 | 10/2010 | Lundy et al. | |
| 7,849,226 | B2 | 12/2010 | Zigmond et al. | |
| 7,925,708 | B2* | 4/2011 | Davis | G06Q 10/107 |
| | | | | 709/206 |
| 8,538,827 | B1 | 9/2013 | Dryer et al. | |
| 8,694,593 | B1* | 4/2014 | Wren | H04L 51/32 |
| | | | | 709/206 |
| 9,076,144 | B2* | 7/2015 | White | G06Q 30/00 |
| 9,317,612 | B1* | 4/2016 | Camplejohn | G06F 16/9535 |
| 9,462,570 | B1* | 10/2016 | Bostick | G06F 17/2705 |
| 9,716,918 | B1* | 7/2017 | Lockton | H04N 21/812 |
| 10,089,650 | B1* | 10/2018 | McClintock | G06Q 30/0255 |
| 2001/0007977 | A1 | 7/2001 | Geary | |

(Continued)

OTHER PUBLICATIONS

Röcker, C. et al., "Context-Dependent Email Notification Using Ambient Displays and Mobile Devices", Proceedings of the International IEEE Conference on Active Media Technology (AMT'05), May 19-21, 2005, pp. 137-138., Takamatsu, Kagawa, Japan.

*Primary Examiner* — Ajay M Bhatia
*Assistant Examiner* — Phoebe X Pan
(74) *Attorney, Agent, or Firm* — Michael A. Petrocelli

(57) ABSTRACT

A method and apparatus are provided for implementing automated personalized, contextual alert displays. A display alert generator correlates user account information to web page advertisement images and text, and posts personalized reminders related to those images and text.

19 Claims, 7 Drawing Sheets

(56) References Cited

U.S. PATENT DOCUMENTS

| | | | |
|---|---|---|---|
| 2003/0229542 A1* | 12/2003 | Morrisroe | G06Q 30/02 705/14.41 |
| 2005/0144073 A1* | 6/2005 | Morrisroe | G06Q 30/02 705/14.5 |
| 2006/0195518 A1* | 8/2006 | Neilsen | H04M 1/72566 709/204 |
| 2006/0282312 A1* | 12/2006 | Carlson | G06Q 30/02 705/14.5 |
| 2007/0073593 A1* | 3/2007 | Perry | G06Q 30/02 705/26.64 |
| 2007/0156429 A1 | 7/2007 | Godar | |
| 2007/0294721 A1* | 12/2007 | Haeuser | H04N 7/17318 725/34 |
| 2008/0082599 A1* | 4/2008 | Sinaniyev | H04L 67/20 709/201 |
| 2008/0148320 A1* | 6/2008 | Howcroft | H04N 5/44513 725/61 |
| 2008/0215426 A1 | 9/2008 | Guldimann et al. | |
| 2009/0012841 A1* | 1/2009 | Saft | G06Q 30/02 705/7.29 |
| 2009/0125358 A1* | 5/2009 | Reynard | G06Q 10/06 705/7.19 |
| 2009/0249391 A1 | 10/2009 | Klein et al. | |
| 2009/0271293 A1* | 10/2009 | Parkhurst | G06Q 30/02 705/26.1 |
| 2009/0307072 A1* | 12/2009 | Morales-Lema | G06Q 30/02 705/14.17 |
| 2010/0094696 A1* | 4/2010 | Molinelli | G06Q 30/0214 705/14.16 |
| 2010/0094860 A1* | 4/2010 | Lin | G06Q 30/02 707/709 |
| 2010/0114720 A1* | 5/2010 | Jones | G06Q 30/0277 705/14.73 |
| 2010/0198628 A1* | 8/2010 | Rayner | G06Q 10/025 705/6 |
| 2010/0223126 A1* | 9/2010 | Tung | G06Q 30/02 705/14.49 |
| 2011/0004520 A1* | 1/2011 | Chou | G06Q 30/02 705/14.53 |
| 2011/0296456 A1* | 12/2011 | Pandala | H04N 5/44543 725/34 |
| 2012/0030292 A1* | 2/2012 | John | G06F 17/30023 709/206 |
| 2012/0144291 A1* | 6/2012 | Chang | H04L 67/2823 715/234 |
| 2012/0150634 A1* | 6/2012 | Shimpa | G06Q 30/0251 705/14.49 |
| 2012/0158472 A1* | 6/2012 | Singh | G06F 17/30241 705/14.4 |
| 2012/0158513 A1* | 6/2012 | Schoen | G06Q 30/0269 705/14.66 |
| 2012/0203639 A1* | 8/2012 | Webster | G06Q 30/0269 705/14.66 |
| 2012/0315008 A1* | 12/2012 | Dixon | G06Q 30/00 386/230 |
| 2013/0046788 A1* | 2/2013 | Goldstein | G06Q 10/109 707/780 |
| 2013/0060644 A1* | 3/2013 | Le Ouay | G06Q 30/0241 705/14.69 |
| 2013/0088337 A1 | 4/2013 | Blanchflower et al. | |
| 2013/0159081 A1* | 6/2013 | Shastry | G06Q 30/0274 705/14.23 |
| 2013/0311300 A1* | 11/2013 | Scarborough | G06Q 30/02 705/14.69 |
| 2013/0325644 A1 | 12/2013 | Sivaraman | |
| 2013/0347033 A1* | 12/2013 | Grab | H04N 21/458 725/34 |
| 2014/0006129 A1* | 1/2014 | Heath | G06Q 30/0222 705/14.23 |
| 2014/0067837 A1* | 3/2014 | Sadhuka | G06F 16/9535 707/758 |
| 2014/0074615 A1 | 3/2014 | Hope et al. | |
| 2014/0108145 A1* | 4/2014 | Patel | G06Q 30/0257 705/14.54 |
| 2014/0136650 A1* | 5/2014 | Keskitalo | H04L 67/26 709/217 |
| 2014/0257979 A1* | 9/2014 | Luke | G06Q 30/0242 705/14.53 |
| 2014/0330860 A1* | 11/2014 | Yi | G06F 17/2705 707/769 |
| 2015/0012363 A1* | 1/2015 | Grant | G06Q 30/0269 705/14.66 |
| 2015/0149544 A1* | 5/2015 | Zhang | G06Q 10/109 709/204 |
| 2015/0172737 A1* | 6/2015 | Lechner | H04N 21/812 725/32 |
| 2015/0193829 A1* | 7/2015 | Mukherjee | G06Q 30/0271 705/14.67 |
| 2015/0262469 A1* | 9/2015 | Davis | G08G 1/005 340/540 |
| 2015/0302470 A1* | 10/2015 | Dru | G06Q 30/0277 705/14.51 |
| 2015/0339707 A1* | 11/2015 | Harrison | G06F 16/00 705/14.5 |
| 2016/0005002 A1* | 1/2016 | Azose | G06Q 10/1093 705/7.18 |
| 2016/0036931 A1* | 2/2016 | Mathis | H04L 67/22 709/224 |
| 2016/0078133 A1* | 3/2016 | Santhanam | G06F 16/9535 707/734 |
| 2016/0092935 A1* | 3/2016 | Bradley | G06Q 30/0276 705/14.72 |
| 2016/0260135 A1* | 9/2016 | Zomet | H04L 12/2812 |
| 2017/0018002 A1* | 1/2017 | Champy | G06Q 30/0257 |
| 2017/0126821 A1* | 5/2017 | Bostick | H04L 67/22 |
| 2017/0160802 A1* | 6/2017 | Hardee | G06F 3/0488 |
| 2018/0137560 A1* | 5/2018 | Chopra | G06Q 30/0643 |
| 2019/0034976 A1* | 1/2019 | Hamedi | G06Q 30/0271 |
| 2019/0141013 A1* | 5/2019 | Mail | G06Q 30/0241 |
| 2019/0155950 A1* | 5/2019 | Niu | G06Q 10/00 |

* cited by examiner

IMPLEMENTING AUTOMATED PERSONALIZED, CONTEXTUAL ALERT DISPLAYS

FIELD OF THE INVENTION

The present invention relates generally to the data processing field, and more particularly, relates to method and apparatus for implementing automated personalized, contextual alert displays.

DESCRIPTION OF THE RELATED ART

In different web pages, image based advertisements are often found at the same time. For example, an advertisement can be embedded in a news portal. Also different types of photographs are uploaded in social networking sites.

In such image based advertisements, there is an opportunity to display a personalized alerts on image objects. The alert can be based on the image object.

SUMMARY OF THE INVENTION

Principal aspects of the present invention are to provide a method and apparatus for implementing automated personalized, contextual alert displays. Other important aspects of the present invention are to provide such method and apparatus substantially without negative effects and that overcome some disadvantages of prior art arrangements.

In brief, a method and apparatus are provided for implementing automated personalized, contextual alert displays. A display alert generator correlates user account information to web page advertisement images, and posts personalized reminders related to those images.

In accordance with features of the invention, advertisements are correlated to user accounts and user information to provide graphical overlays of notifications or modified advertisement images and/or text related to those accounts. The alert optionally is blinking.

In accordance with features of the invention, the display alert generator displays a dashboard icon, for example based on the number of days remaining. Upon clicking the alert or the dashboard icon, the user is provided more information, such as an amount due.

In accordance with features of the invention, the user can define a relationship between the user's need and a service provider. For example, registering online insurance payment with "New York Life."

In accordance with features of the invention, the display alert generator optionally operates on a user's device or a server system.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and apparatus are provided for implementing automated personalized, contextual alert displays.

Figure 1:
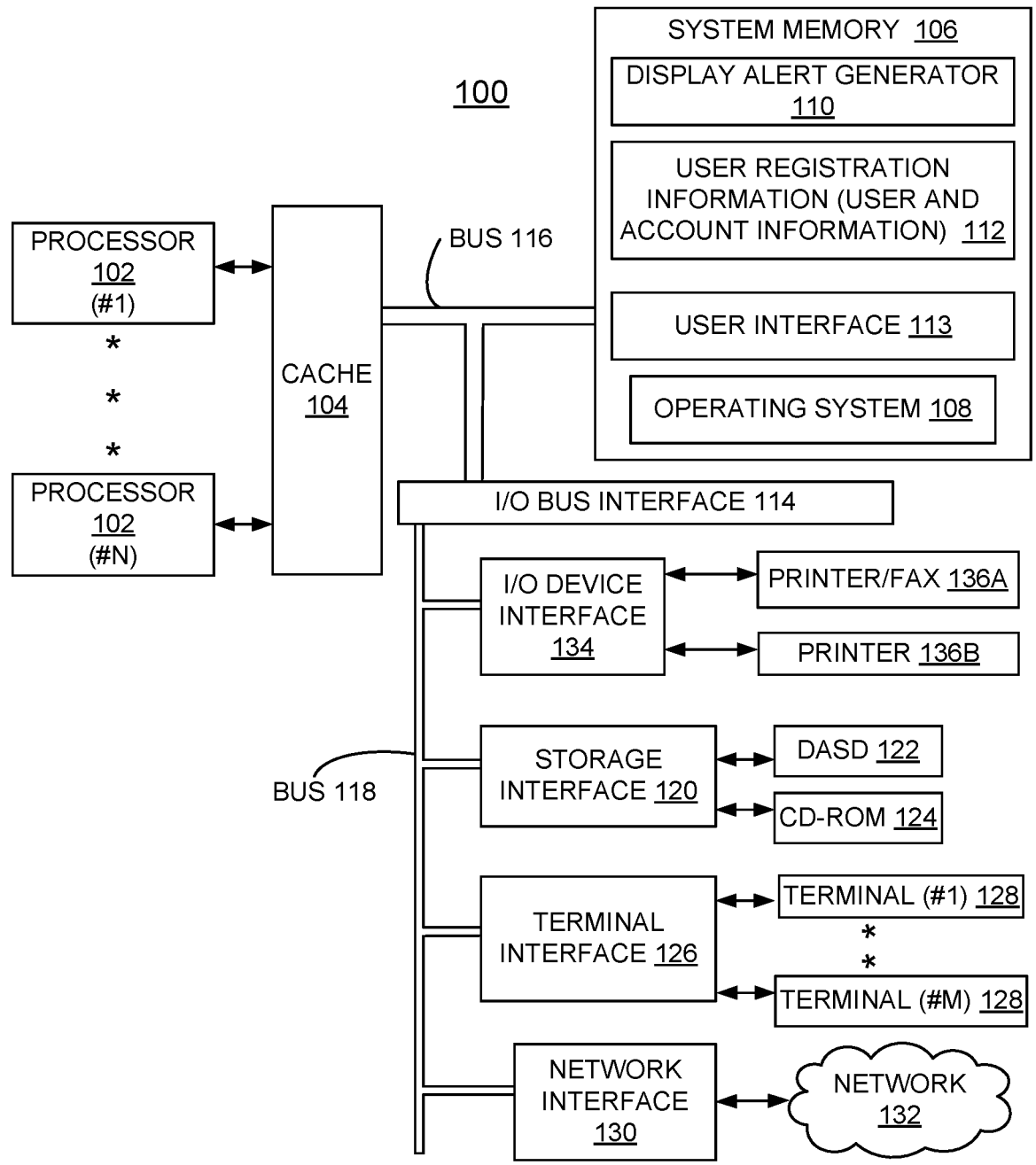
FIG. 1 is a block diagram of an example computer system for implementing automated personalized, contextual alert displays in accordance with the preferred embodiments.

Having reference now to the drawings, in FIG. 1, there is shown a computer system embodying the present invention generally designated by the reference character 100 for implementing automated personalized, contextual alert displays in accordance with the preferred embodiment. Computer system 100 includes one or more processors 102 or general-purpose programmable central processing units (CPUs) 102, #1-N. As shown, computer system 100 includes multiple processors 102 typical of a relatively large system; however, system 100 can include a single CPU 102. Computer system 100 includes a cache memory 104 connected to each processor 102.

Computer system 100 includes a system memory 106, an operating system 108, a display alert generator 110 and user registration information 112 including user information and user account information in accordance with embodiments of the invention and a user interface 113. System memory 106 is a random-access semiconductor memory for storing data, including programs. System memory 106 is comprised of, for example, a dynamic random access memory (DRAM), a synchronous direct random access memory (SDRAM), a current double data rate (DDRx) SDRAM, non-volatile memory, optical storage, and other storage devices.

I/O bus interface 114, and buses 116, 118 provide communication paths among the various system components. Bus 116 is a processor/memory bus, often referred to as front-side bus, providing a data communication path for transferring data among CPUs 102 and caches 104, system memory 106 and I/O bus interface unit 114. I/O bus interface 114 is further coupled to system I/O bus 118 for transferring data to and from various I/O units.

As shown, computer system 100 includes a storage interface 120 coupled to storage devices, such as, a direct access storage device (DASD) 122, and a CD-ROM 124. Computer system 100 includes a terminal interface 126 coupled to a plurality of terminals 128, #1-M, a network interface 130 coupled to a network 132, such as the Internet, local area or other networks, and a I/O device interface 134 coupled to I/O devices, such as a first printer/fax 136A, and a second printer 136B.

I/O bus interface 114 communicates with multiple I/O interface units 120, 126, 130, and 134, which are also known as I/O processors (IOPs) or I/O adapters (IOAs), through system I/O bus 116. System I/O bus 116 is, for example, an industry standard PCI bus, or other appropriate bus technology.

Computer system 100 is shown in simplified form sufficient for understanding the present invention. It should be understood that the present invention is not limited to the illustrated arrangement of computer system 100.

Figure 2:
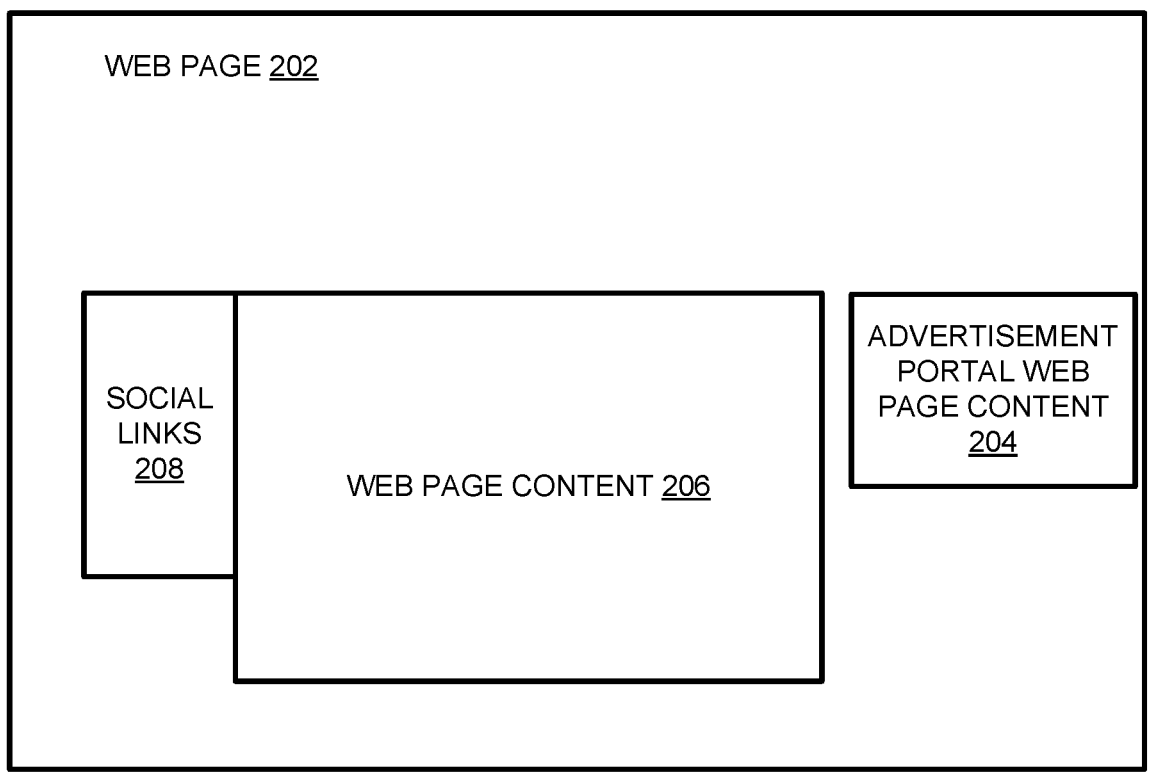
FIGS. 2, 3, and 4 illustrate respective display examples for implementing automated personalized, contextual alert display in accordance with the preferred embodiments.
Figure 3:
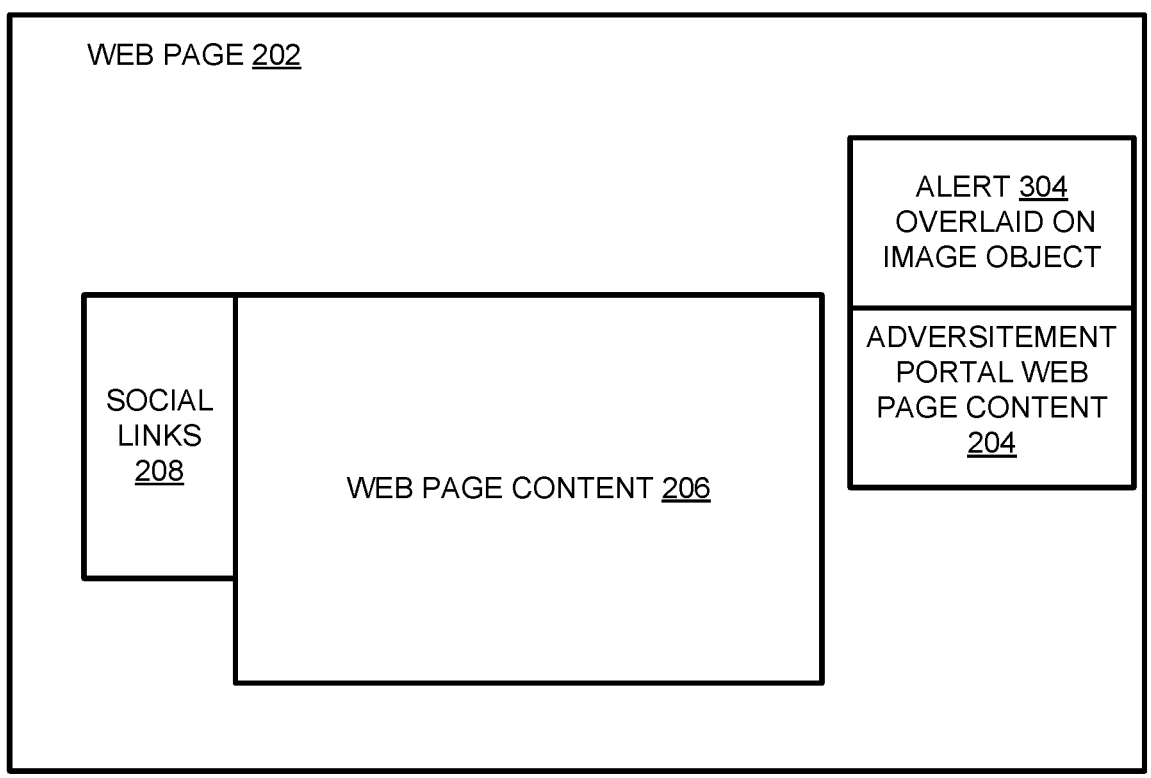
Figure 4:
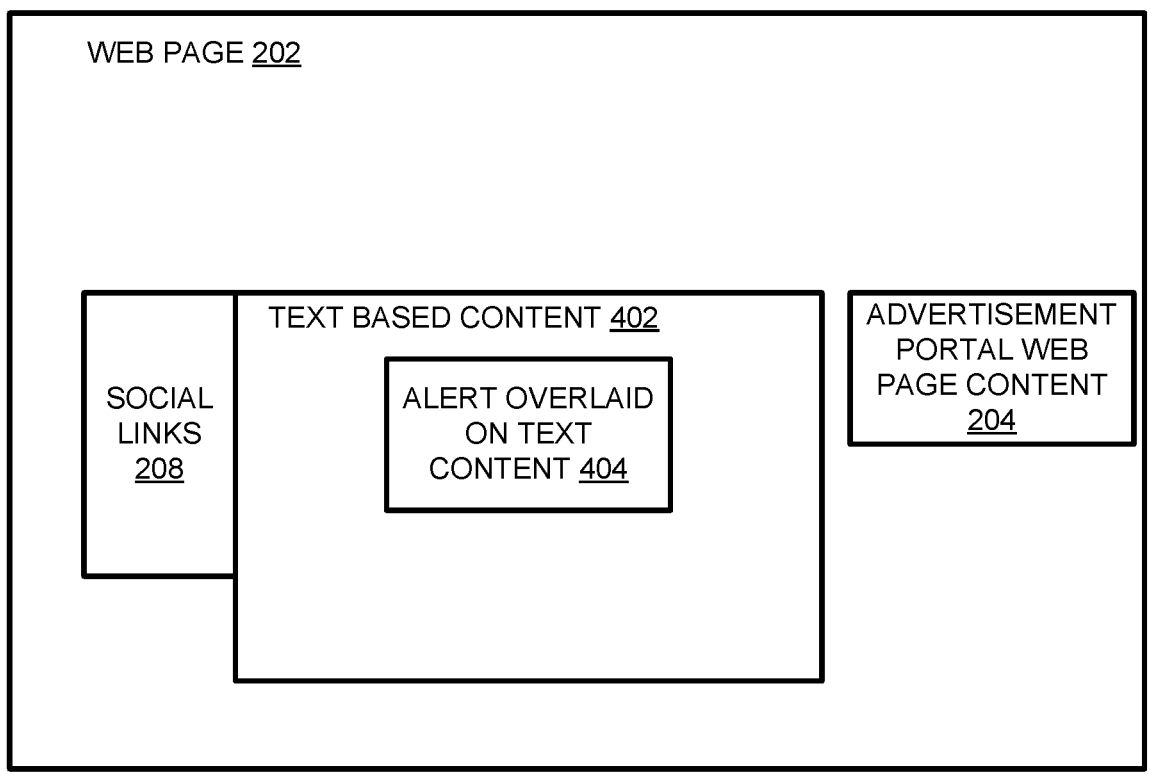

Example displays implemented using display alert generator 110 in accordance with the preferred embodiments are illustrated in FIGS. 2, 3, and 4.

Referring now to FIG. 2, there is shown an example display generally designated by the reference character 200 for implementing display alert generation in accordance with the preferred embodiment. The illustrated display 200 includes a web page 202 including advertisement portal web page content 204, web page content 206, and a plurality of social links 208. Display alert generator 110 searches the web page 202 to correlate user account information to web page advertisement images and text, and to post timely personalized reminders related to those images in accordance with the preferred embodiments.

Referring now to FIG. 3, there is shown an example display generally designated by the reference character 300 for implementing display alert generation in accordance with the preferred embodiment. The illustrated display 300 includes the web page 202 including advertisement portal web page content 204, web page content 206, and the plurality of social links 208. The illustrated display 300 includes an alert 304 in accordance with the preferred embodiments overlaid on the image object 204.

Referring now to FIG. 4, there is shown another example display generally designated by the reference character 400 for implementing display alert generation in accordance with the preferred embodiment. The illustrated display 400 includes the web page 202 including advertisement portal web page content 204, and the plurality of social links 208. The illustrated display 400 includes text based web page content 402, and an alert 404 in accordance with the preferred embodiments overlaid on the text based web page content 402.

Figure 5:
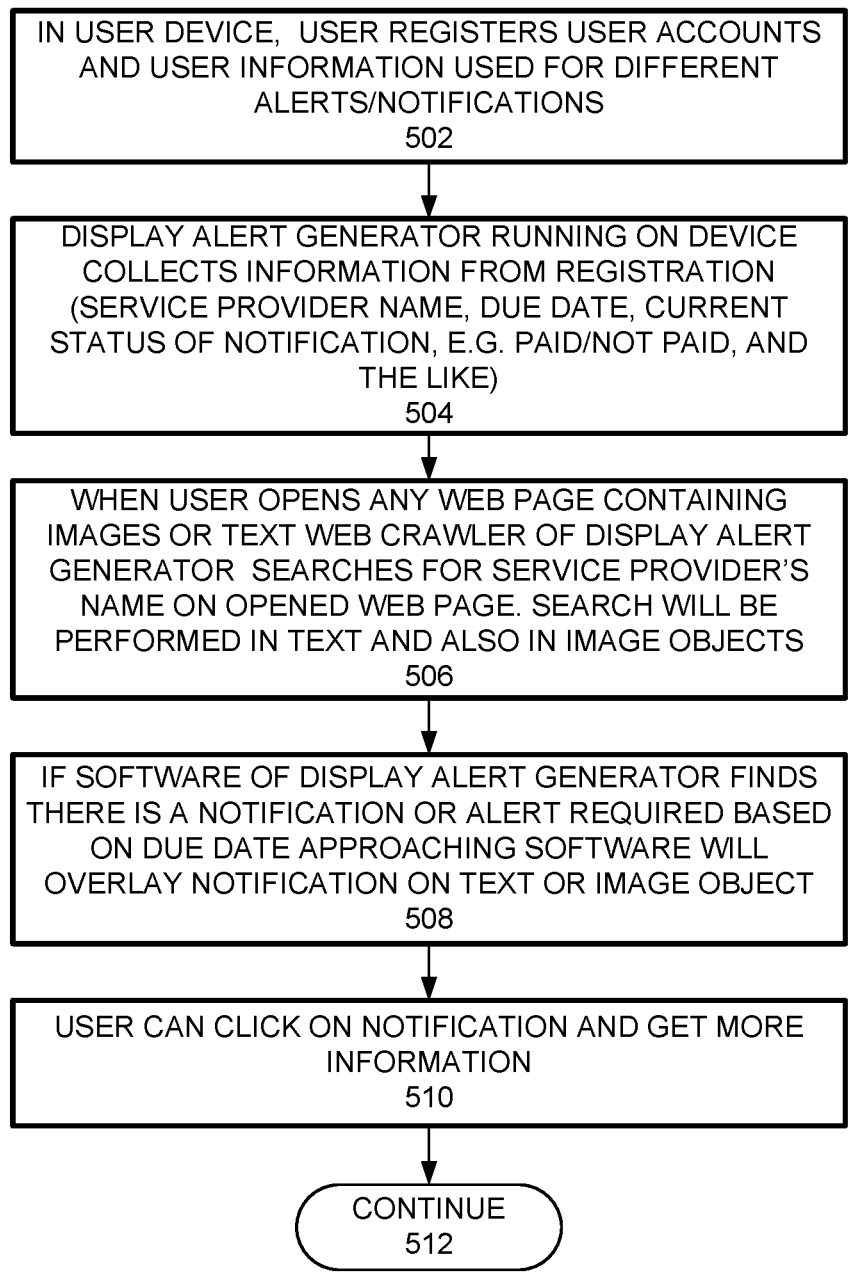
FIGS. 5 and 6 are flow charts illustrating example steps for implementing automated personalized, contextual alert displays in accordance with the preferred embodiment.

Referring now to FIG. 5, there are shown example steps generally designated by the reference character 500 for implementing display alert generation in accordance with the preferred embodiment. As indicated in a block 502, in a user device, a user registers user accounts and user information used for different alerts and notifications. The display alert generator running on the device collects information from registration, such as service provider name, due date, current status of notification, for example, paid or not paid, and the like as indicated in a block 504. As indicated in a block 506, when a user opens any web page containing images or text, a web crawler of the display alert generator searches for service provider's name on the opened web page. The search is performed in text and also in image objects. As indicated in a block 508, if software of display alert generator finds there is a notification or alert required, for example, based on due date approaching, software will overlay notification on text or image object. Additionally, display alert generator may temporarily modify user images, such as a social networking site, related to the context; as an example, if a user is viewing a picture of their dog, the dog image may be overlaid with an outstanding veterinary bill.

As indicated in a block 510, user can click on the notification and get more information. Operations continue as indicated in a block 512.

Figure 6:
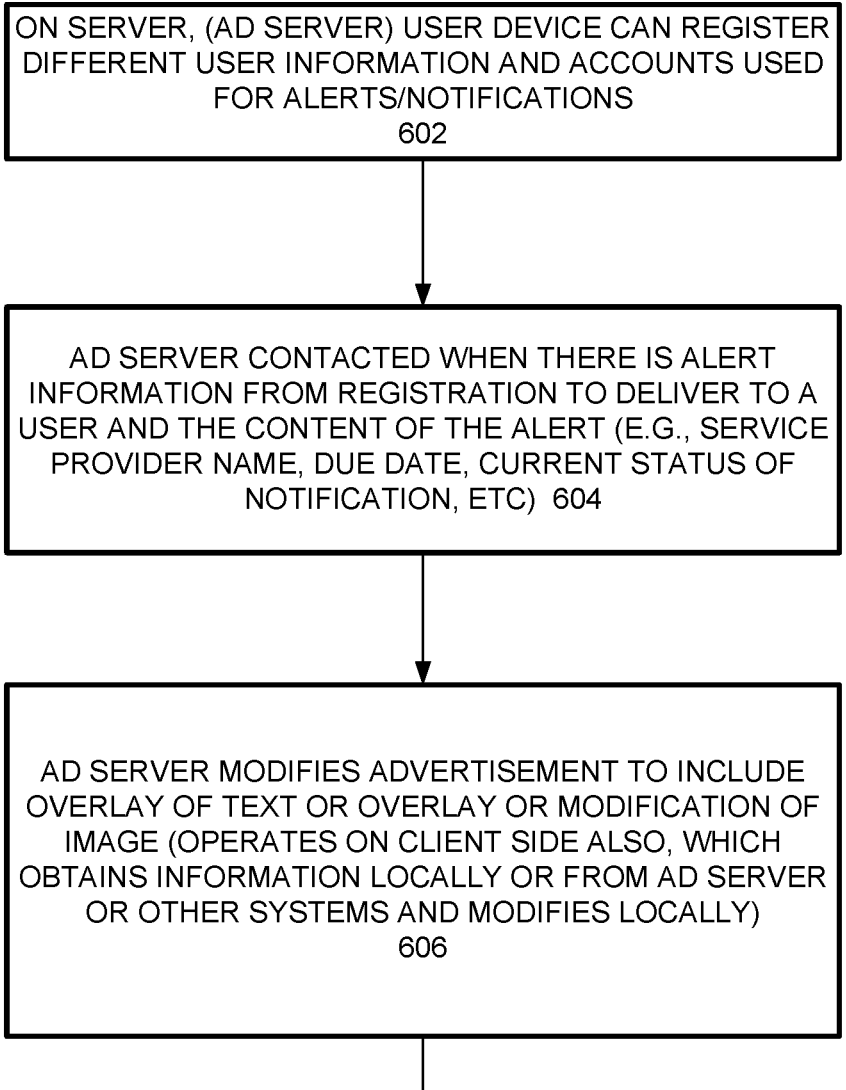

Referring now to FIG. 6, there are shown example steps generally designated by the reference character 600 for implementing display alert generation in accordance with the preferred embodiment. As indicated in a block 602, on a server, such as an advertisement (ad) server, a user registers user accounts and user information used for different alerts and notifications. As indicated in a block 604, the ad server is contacted when there is alert information from registration to deliver to a user and the content of the alert, such as service provider name, due date, current status of notification and the like. Then as indicated in a block 606, the ad server modifies the advertisement to include overlay of text and/or overlay or modification of image. This operates on the client or user side also, which obtains information locally or from the ad server or other systems and modifies locally at block 606. Operations continue as indicated in a block 608.

Figure 7:
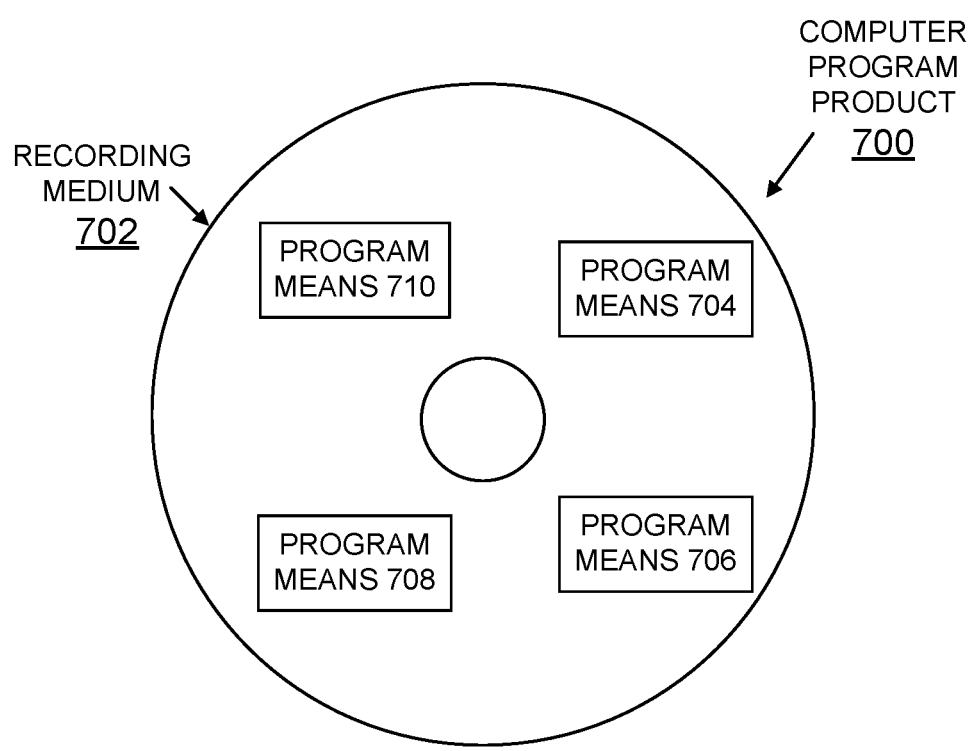
FIG. 7 is a block diagram illustrating a computer program product in accordance with the preferred embodiments.

Referring now to FIG. 7, an article of manufacture or a computer program product 700 of the invention is illustrated. The computer program product 700 is tangibly embodied on a non-transitory computer readable storage medium that includes a recording medium 702, such as, a floppy disk, a high capacity read only memory in the form of an optically read compact disk or CD-ROM, a tape, or another similar computer program product. Recording medium 702 stores program means 704, 706, 708, and 710 on the medium 702 for carrying out the methods for implementing automated personalized, contextual alert displays of the preferred embodiments in the system 100 of FIG. 1.

A sequence of program instructions or a logical assembly of one or more interrelated modules defined by the recorded program means 704, 706, 708, and 710, direct the system 100 for implementing automated personalized, contextual alert displays of the preferred embodiments.

While the present invention has been described with reference to the details of the embodiments of the invention shown in the drawing, these details are not intended to limit the scope of the invention as claimed in the appended claims.

What is claimed is:

1. An apparatus provided on a user device for implementing automated personalized, contextual alert displays comprising:
   a processor displaying a dashboard icon providing information for a user alert; and
   a display alert generator tangibly embodied in a non-transitory machine readable medium used in implementing automated personalized, contextual alert displays on the user device,
   a user entering user accounts and user information for registration for different user entered alerts and notifications, each said user entered user account and user information storing a service provider name,
   said processor using said display alert generator, collecting information from the registration, responsive to a user opening a web page, searching the web page for said service provider name stored with each said user entered user account, and responsive to each identified service provider name, searching web page text and image objects, correlating said user entered user account and said user entered user information to web page advertisement images and web page advertisement text, and generating and posting an alert display modifying the web page on the user device including timely posting personalized reminders related to said user entered user account and said user entered user information on web page advertisement images, enabling a user to click one said posted personalized reminder to get more information and responsive to the text and image objects on the web page matching a context of the user, temporarily modifying the text and image objects by overlaying timely personalized reminders related to said context on the text and image objects.

2. The apparatus as recited in claim 1 includes said processor correlating advertisements to said user entered user account and said user entered user information and providing graphical overlays of notifications on web page advertisement images, and wherein the web page comprises a social networking site and the text and image objects comprise information uploaded by the user to the social networking site.

3. The apparatus as recited in claim 2 further includes said processor providing graphical overlays to advertisement text.

4. The apparatus as recited in claim 1 includes said processor receiving user entered user information including user entered user information for a service provider.

5. The apparatus as recited in claim 1 wherein said processor using said display alert generator includes said display alert generator provided on a server system.

6. The apparatus as recited in claim 1 wherein said processor using said display alert generator includes said display alert generator provided on a user's computer system.

7. The apparatus as recited in claim 1 wherein said processor using said display alert generator includes said display alert generator storing user information defining a relationship between a user's need and a service provider.

8. The apparatus as recited in claim 1 wherein said processor using said display alert generator includes said processor displaying additional information responsive to the user clicking one said posted personalized reminder.

9. The apparatus as recited in claim 1 wherein said processor using said display alert generator, correlating said user entered user account and said user entered user information to web page advertisement images includes said processor registering user entered user information including user accounts for different alerts and notifications.

10. The apparatus as recited in claim 9 further includes said processor storing said user entered user information on a selected one of a user's device and a server system.

11. A method for implementing automated personalized, contextual alert displays using a user device, said method comprising:
displaying automated personalized, contextual alert displays on the user device comprising the steps of:
entering user accounts and user information by a user for registering different user entered alerts and notifications, each of the user accounts and user information store a service provider name;
collecting information associated with the different user entered alerts and notifications;
responsive to the user opening a web page, searching the web page for said service provider name stored with each said user entered user account, and responsive to each identified service provider name, searching web page text and image objects, and correlating said user entered user account and said user entered user information to web page advertisement images and web page advertisement text;
generating and posting an alert display modifying the web page of the user device including overlaying timely personalized reminders related to said user entered user account information on the web page advertisement images;
enabling a user to click one said timely personalized reminder to get more information; and
responsive to the text and image objects on the web page matching a context of the user, temporarily modifying the text and image objects by overlaying timely personalized reminders related to said context on the text and image objects.

12. The method as recited in claim 11 wherein correlating said user entered user account and said user entered user information to web page advertisement images includes searching web page advertisement images for said service provider name stored with each said user entered user, and providing graphical overlays of alerts to web page advertisement images, and wherein the web page comprises a social networking site and the text and image objects comprise information uploaded by the user to the social networking site.

13. The method as recited in claim 12 includes searching web page advertisement text for said service provider name stored with each said user entered user, and providing graphical overlays of alerts to advertisement text.

14. The method as recited in claim 11 includes registering user information received from the user including user accounts for the different user entered alerts and notifications.

15. The method as recited in claim 14 includes storing said user entered information on a user's computer device or a server system.

16. The method as recited in claim 11 includes storing user information defining a relationship between a user's need and a service provider.

17. The method as recited in claim 11 includes displaying additional information responsive to the user clicking one said posted personalized reminder.

18. The method as recited in claim 11 includes correlating advertisements to user entered user accounts and user entered user information and providing graphical overlays of notifications on web page advertisement images.

19. The method as recited in claim 18 includes providing graphical overlays to advertisement text.

* * * * *